United States Patent
Park et al.

(10) Patent No.: US 12,333,771 B2
(45) Date of Patent: Jun. 17, 2025

(54) METHOD AND APPARATUS FOR COMPARING AND DETERMINING THREE-DIMENSIONAL IDENTITY OF TOOL MARK

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Nam Kyu Park, Bucheon-si (KR); Byung Seon Moon, Busan (KR); Jae Mo Goh, Seoul (KR); Jin Pyo Kim, Daejeon (KR); Young Il Seo, Wonju-si (KR); Eun Ah Joo, Wonju-si (KR); Je Hyun Lee, Wonju-si (KR); Ho Yong Yie, Wonju-si (KR)

(73) Assignee: REPUBLIC OF KOREA (NATIONAL FORENSIC SERVICE DIRECTOR MINISTRY OF THE INTERIOR AND SAFETY), Wonju-si (KR)

(*) Notice: Subject to any disclaimer, the term of this patent is extended or adjusted under 35 U.S.C. 154(b) by 393 days.

(21) Appl. No.: 17/939,151

(22) Filed: Sep. 7, 2022

(65) Prior Publication Data
US 2023/0419634 A1    Dec. 28, 2023

(30) Foreign Application Priority Data
Jun. 22, 2022 (KR) .................. 10-2022-0076270

(51) Int. Cl.
*G06V 10/22*    (2022.01)
*G06V 10/77*    (2022.01)
*G06V 20/64*    (2022.01)

(52) U.S. Cl.
CPC ........ *G06V 10/225* (2022.01); *G06V 10/7715* (2022.01); *G06V 20/647* (2022.01)

(58) Field of Classification Search
USPC ....................................................... 382/100
See application file for complete search history.

(56) References Cited

U.S. PATENT DOCUMENTS 7,822,263 B1 * 10/2010 Prokoski ................. F42B 35/00
382/152
10,697,899 B1 * 6/2020 Park ................... G01N 21/8851
(Continued)

FOREIGN PATENT DOCUMENTS

KR    10-2295077 B1    9/2021

OTHER PUBLICATIONS

Vorburger et al., "Topography measurements and applications in ballistics and tool mark identifications", Dec. 17, 2015, PMC PubMed Central, doi: 10.1088/2051-672X/4/1/013002, pp. 9, 12-17, 20-21, and 23-24 (Year: 2015).*

(Continued)

*Primary Examiner* — Chineyere Wills-Burns
*Assistant Examiner* — Aaron Timothy Bonansinga
(74) *Attorney, Agent, or Firm* — Hauptman Ham, LLP

(57) ABSTRACT

A method of comparing and determining three-dimensional (3D) identity of a tool mark includes: obtaining a 3D image of a suspect tool and a tool mark; extracting a contact portion of the suspect tool contributed to formation of the tool mark from the 3D image of the suspect tool; determining a matching area by comparing a shape of the contact portion 12 of the suspect tool 10 with a shape of the tool mark 20; and calculating a matching rate between the contact portion of the suspect tool and the tool mark.

7 Claims, 7 Drawing Sheets

(56) References Cited

U.S. PATENT DOCUMENTS

| | | | | |
|---|---|---|---|---|
| 2006/0047477 A1* | 3/2006 | Bachrach | ............. | G06T 7/0004 |
| | | | | 702/182 |
| 2011/0248990 A1* | 10/2011 | Beauchamp | ........... | G06V 20/64 |
| | | | | 345/419 |
| 2019/0026595 A1* | 1/2019 | Seo | ...................... | G06V 10/751 |
| 2019/0219806 A1* | 7/2019 | Poole | ................ | G02B 21/0008 |

OTHER PUBLICATIONS

Chumbley et al., "Development of a Mobile, Automated Tool Mark Characterization and Comparison System", Feb. 2017, NCJRS, Document No. 250569, pp. 1-46 (Year: 2017).*

Kumar et al., "Forensic Analysis and Interpretation of Tool Marks", Jun. 21, 2021, pp. 1-9 (Year: 2021).*

Spotts et al., "Optimization Of A Statistical Algorithm For Objective Comparison Of Toolmark", Mar. 2015, Journal of Forensic Science, vol. 60, No. 2, DOI: 10.1111/1556-4029.12642, pp. 303-314 (Year: 2015).*

Kovács et al., "Automatic Tool Mark Identification And Comparison With Known Bronze Age Hand Tool Replicas", Sep. 2013, ISPRS Annals of the Photogrammetry, Remote Sensing and Spatial Information Sciences, vol. II-5/W1, DOI: 10.5194/isprsannals-II-5-W1-181-2013, pp. 181-186 (Year: 2013).*

* cited by examiner

METHOD AND APPARATUS FOR COMPARING AND DETERMINING THREE-DIMENSIONAL IDENTITY OF TOOL MARK

CROSS-REFERENCE TO RELATED APPLICATIONS

The present application is based on and claims priority to Korean Patent Application No. 10-2022-0076270 filed on Jun. 22, 2022, in the Korean Intellectual Property Office, which is incorporated herein by reference in its entirety.

BACKGROUND

1. Field

One or more embodiments relate to a method and an apparatus for comparing and determining three-dimensional identity of a tool mark.

2. Description of the Related Art

Tool marks found at crime scenes are important evidence that may not only estimate the type and shape of a suspect tool and reconstruct the criminal's behavior, but also contribute to the resolution of a case through identity determination and analysis when a suspect tool is presented.

When a suspect tool is presented, it may be determined whether or not the suspect tool is the same as a tool mark at a crime scene, and it is necessary to develop a more accurate comparison technique in an identity determination operation.

For accurate tool mark analysis, a more objective and intuitive tool mark identity analysis technique is needed.

[Patent Document] Korean Patent No. 10-2295077 (registered on Aug. 23, 2021)

SUMMARY

One or more embodiments include methods and apparatuses for comparing and determining three-dimensional identity of a tool mark capable of objectively analyzing, when a tool mark is collected at a crime scene and a suspect tool is presented, the identity of the suspect tool and the tool mark to conduct more reliable analysis and research.

One or more embodiments include methods and apparatuses for comparing and determining three-dimensional identity of a tool mark capable of intuitively expressing an analysis result by quantifying and visualizing the identity of a suspect tool and a tool mark.

According to one or more embodiments, a method of comparing and determining three-dimensional (3D) identity of a tool mark includes: obtaining a 3D image of a suspect tool and a tool mark; extracting a contact portion of the suspect tool contributed to formation of the tool mark from the 3D image of the suspect tool; determining a matching area by comparing a shape of the contact portion of the suspect tool with a shape of the tool mark; and calculating a matching rate between the contact portion of the suspect tool and the tool mark.

In an embodiment, the calculating of the matching rate may include: converting the 3D image of the suspect tool and the tool mark into a stereolithography (STL) file format image; converting the STL file format image into height data of the suspect tool and the tool mark; and calculating a two-dimensional cross-correlation coefficient of height data of the contact portion of the suspect tool and the tool mark.

In an embodiment, the method of comparing and determining 3D identity of a tool mark may include: extracting a region of interest (ROI) having a highest matching rate and confirming relevant numerical information within the ROI.

In an embodiment, the relevant numerical information may include a difference value and an average of height data of the contact portion of the suspect tool and the tool mark.

According to one or more embodiments, an apparatus for comparing and determining 3D identity of a tool mark includes: a 3D image acquisition unit configured to obtain a 3D image of a suspect tool and a tool mark; a contact portion extraction unit configured to extract a contact portion of the suspect tool contributed to formation of the tool mark from the 3D image of the suspect tool; a matching area determination unit configured to compare a shape of the contact portion of the suspect tool with a shape of the tool mark to determine a matching area; and a matching rate calculation unit configured to calculate a matching rate between the contact portion of the suspect tool and the tool mark.

In an embodiment, the matching rate calculation unit may include: an image format conversion unit configured to convert the 3D image of the suspect tool and the tool mark into an STL file format image; a data conversion unit configured to convert the STL file format image into height data of the suspect tool and the tool mark; and a cross-correlation coefficient calculation unit configured to calculate a two-dimensional cross-correlation coefficient of height data of the contact portion of the suspect tool and the tool mark.

In an embodiment, the apparatus for comparing and determining 3D identity of a tool mark may include: an ROI confirmation unit configured to confirm, by extracting an ROI having a highest matching rate, relevant numerical information within the ROI.

In an embodiment, the relevant numerical information may include a difference value and an average of height data of the contact portion of the suspect tool and the tool mark.

In an embodiment, the ROI confirmation unit may include a visualization unit configured to visualize the relevant numerical information.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
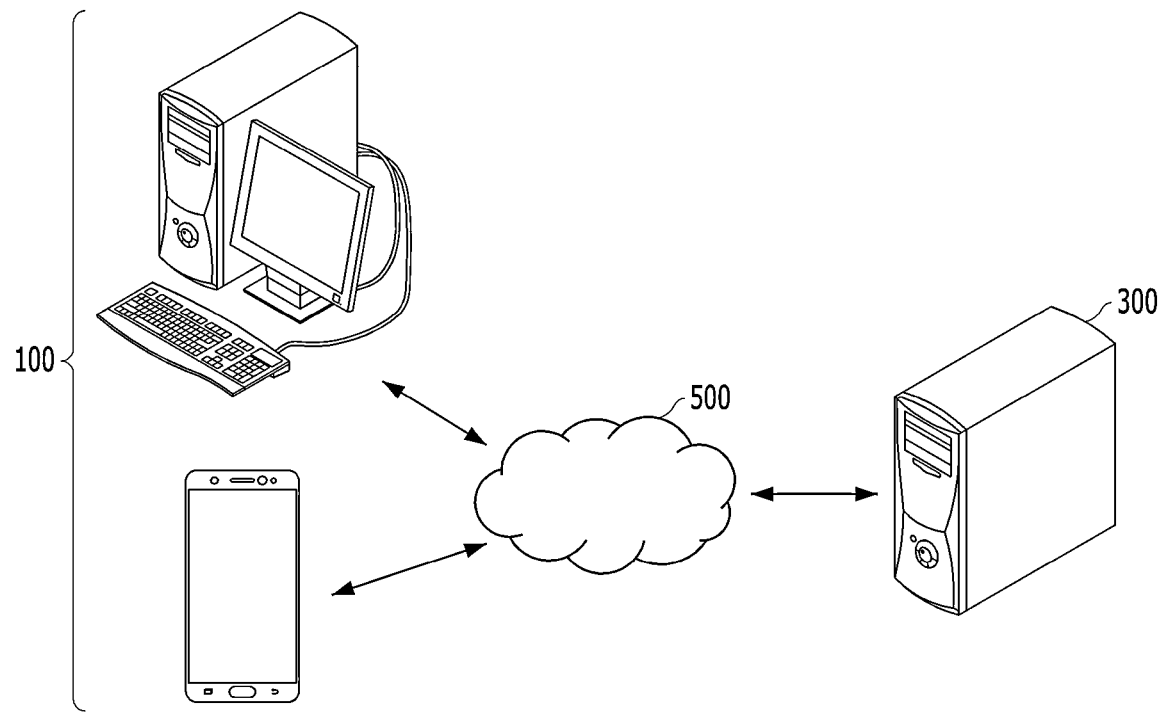
FIG. 1 is a schematic view of a system for comparing and determining three-dimensional (3D) identity of a tool mark according to an embodiment.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

Sizes of elements in the drawings may be exaggerated for convenience of explanation. In other words, since sizes and thicknesses of components in the drawings are arbitrarily illustrated for convenience of description, the following embodiments are not limited thereto.

When a certain embodiment may be implemented differently, a specific process order may be performed differently from the described order. For example, two consecutively described processes may be performed substantially at the same time or performed in an order opposite to the described order.

FIG. 1 is a schematic view of a system for comparing and determining three-dimensional (3D) identity of a tool mark according to an embodiment.

Referring to FIG. 1, the system for comparing and determining 3D identity of a tool mark according to an embodiment may include an apparatus for comparing and determining 3D identity of a tool mark 100, a server 300, and a network 500 connecting them.

The system for comparing and determining 3D identity of a tool mark according to an embodiment provides a service for comparing and determining 3D identity of a tool mark. In more detail, in the system for comparing and determining 3D identity of a tool mark provided according to an embodiment, a user may upload data obtained by a method of comparing and determining 3D identity of a tool mark 200 to be tested, and share the uploaded data with other users. For example, a user may upload data about a 3D image of a suspect tool 10 and a tool mark 20 found at a crime scene. When a user uploads data, the system for comparing and determining 3D identity of a tool mark according to an embodiment may register the data with the server 300, and may provide an interface through which other users may inquire the data registered in the server 300.

The apparatus for comparing and determining 3D identity of a tool mark 100 according to an embodiment may be connected to the server 300 through the network 500. The apparatus for comparing and determining 3D identity of a tool mark 100 to which the disclosure is applied may be various types of information processing devices used by a user, for example, a personal computer (PC), a laptop computer, a mobile phone, a tablet PC, a smart phone, personal digital assistants (PDA), or the like. However, these are only examples, and in addition to the above-described examples, the apparatus for comparing and determining 3D identity of a tool mark 100 needs to be interpreted as a concept including all devices capable of communication that are currently developed and commercialized or to be developed in the future. The method of comparing and determining 3D identity of a tool mark 200 provided according to an embodiment may be borrowed without limitation on any device as long as an application in which the method of comparing and determining 3D identity of a tool mark 200 is programmed can be installed.

The network 500 connects the apparatus for comparing and determining 3D identity of a tool mark 100 to the server 300. For example, the network 500 provides a connection path such that the apparatus for comparing and determining 3D identity of a tool mark 100 may transmit and receive packet data to and from the server 300 after accessing the server 300.

Although not shown in the drawings, the server 300 according to an embodiment may include a memory, an input/output unit, a program storage unit, a control unit, and the like.

Figure 2:
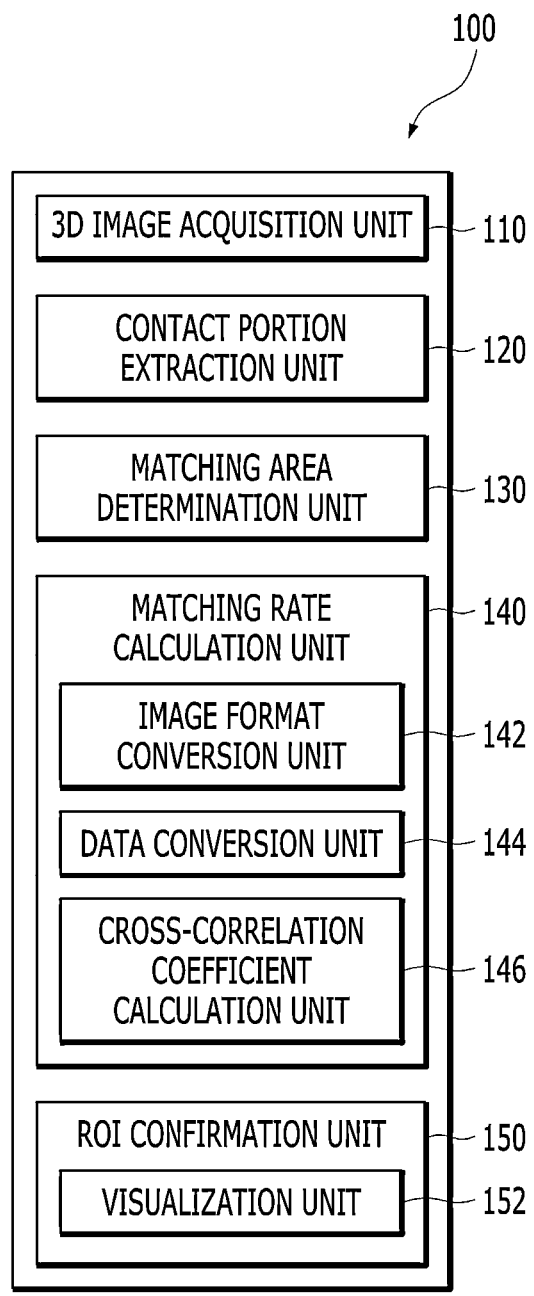
FIG. 2 is a schematic block diagram of an apparatus for comparing and determining 3D identity of a tool mark of FIG. 1.

FIG. 2 is a schematic block diagram of the apparatus for comparing and determining 3D identity of a tool mark 100 of FIG. 1.

The apparatus for comparing and determining 3D identity of a tool mark 100 according to an embodiment may correspond to at least one processor or may include at least one processor. Accordingly, the apparatus for comparing and determining 3D identity of a tool mark 100 may be driven in a form included in a hardware device such as a microprocessor or a general-purpose computer system.

The apparatus for comparing and determining 3D identity of a tool mark 100 in FIG. 2 shows only components associated with the present embodiment to prevent features of the present embodiment is blurred. Accordingly, it is to be understood by one of ordinary skill in the art that other general-purpose components may be further included in addition to the components shown in FIG. 2.

Figure 3:
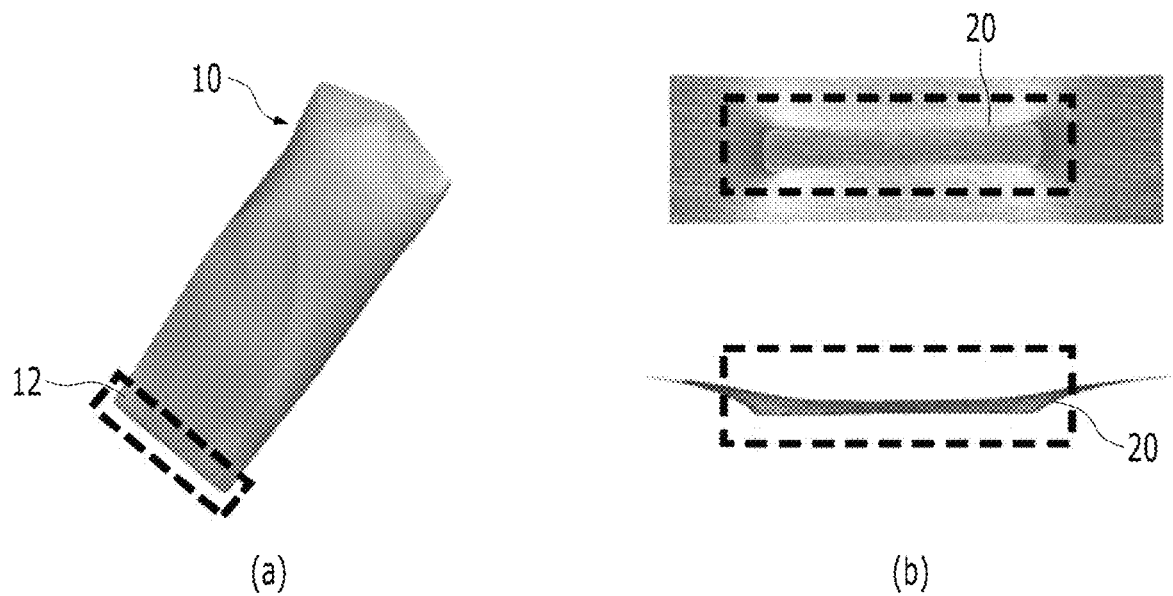
FIG. 3 is a view of a 3D image of a contact portion of a suspect tool and a tool mark.
Figure 4:
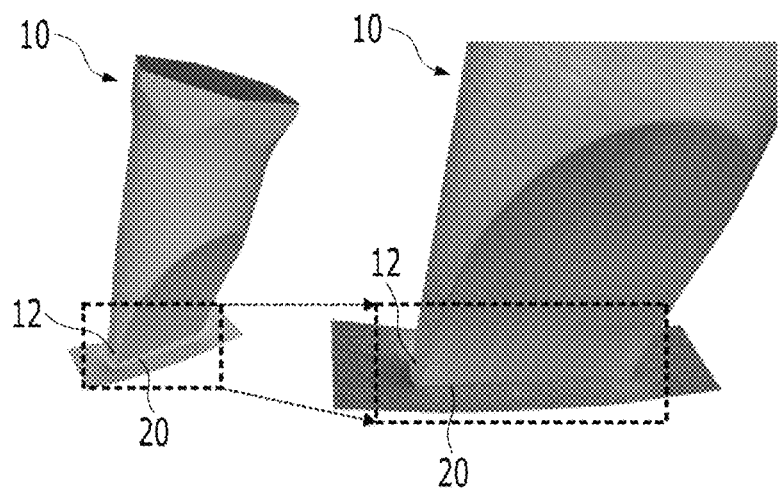
FIG. 4 is a view of a 3D image of a suspect tool and a tool mark in a combined state.
Figure 5:
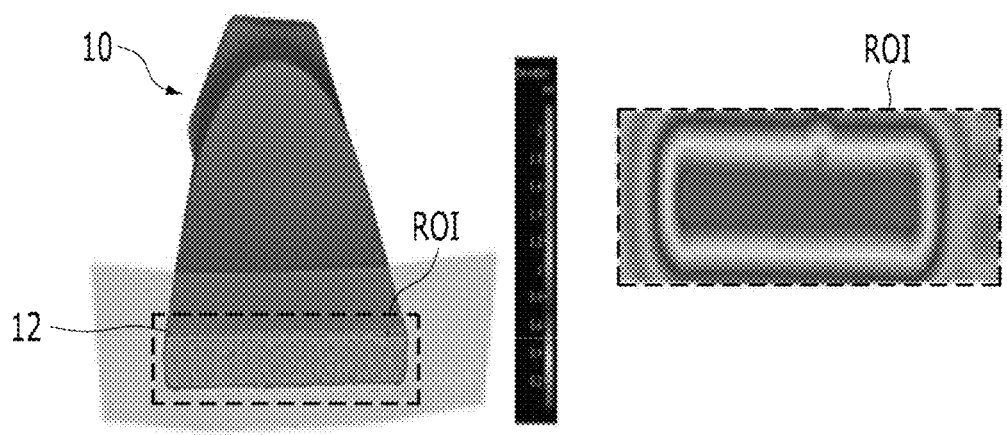
FIG. 5 is a view illustrating visualization of a difference value of height data for a region of interest (ROI)

FIG. 3 is a view of a 3D image of a contact portion of a suspect tool and a tool mark, FIG. 4 is a view of a 3D image of a suspect tool and a tool mark in a combined state, and FIG. 5 is a view illustrating visualization of a difference value of height data for a region of interest (ROI).

Referring to FIGS. 2 to 5, the apparatus for comparing and determining 3D identity of a tool mark 100 according to an embodiment may include a 3D image acquisition unit 110, a contact portion extraction unit 120, a matching area determination unit 130, a matching rate calculation unit 140, and an ROI confirmation unit 150.

The 3D image acquisition unit 110 may obtain a 3D image by photographing the suspect tool 10 and the tool mark 20.

For example, the 3D image acquisition unit 110 may include a 3D microscope having a high-resolution function to precisely photograph the suspect tool 10 and the tool mark 20. The 3D image acquisition unit 110 may obtain an image by directly photographing the suspect tool 10 and the tool mark 20. In addition, the 3D image acquisition unit 110 may receive an image of the suspect tool 10 and the tool mark 20 from another photographing device or the server 300. The 3D image acquisition unit 110 is not limited to a 3D microscope as long as it can directly photograph a 3D image of the suspect tool 10 and the tool mark 20 or receive a 3D image.

The contact portion extraction unit 120 may extract a contact portion 12 of the suspect tool 10 contributing to the formation of the tool mark 20 from a 3D image of the suspect tool 10.

For example, an experimenter may directly form the tool mark 20 with the suspect tool 10. When the suspect tool 10 is a driver, the experimenter may form the tool mark 20 by colliding a blade of the driver with a specimen (e.g., a can lid, etc.). The contact portion 12 of the suspect tool 10, which contributed to the formation of the tool mark 20, corresponds to a blade of the driver, and the tool mark 20 by the blade of the driver may be formed in the specimen. Because not all portions of the suspect tool 10 contribute to the formation of the tool mark 20, by extracting the blade of the driver contributed to the formation of the tool mark 20, a calculation error may be reduced when comparing the suspect tool 10 with the tool mark 20 to determine the identity.

FIG. 3 (*a*) is a view of the contact portion 12 contributed to the formation of the tool mark 20 in the suspect tool 10, and FIG. 3 (*b*) is a view of the tool mark 20. As shown in FIG. 3, the contact portion 12 contributed to the formation of the tool mark 20 in the suspect tool 10 may be extracted.

The matching area determination unit 130 may compare the contact portion 12 of the suspect tool 10 with the tool mark 20 to determine the morphological similarity and determine the matching area. By confirming the approximate similarity of the size and shape of the contact portion 12 of the suspect tool 10 and the tool mark 20 obtained as a 3D image, the matching area may be determined.

For example, as shown in FIG. 4, by directly coupling the contact portion 12 of the suspect tool 10 and the tool mark 20 in a 3D virtual space, it may be confirmed whether the contact portion 12 of the suspect tool 10 and the tool mark 20 have the morphological similarity. When a matching rate is calculated within a matching area after determining an approximate matching area of the suspect tool 10 and the tool mark 20, a calculation error that may occur when determining the identity by comparing the suspect tool 10 with the tool mark 20 may be reduced.

For example, there is a difference in shape between a tool mark formed by a hammer and a tool mark formed by a driver. In addition, in the case of the tool mark formed by the driver, there is a difference in the size of the tool mark that appears due to the length of a blade of the driver. Accordingly, after confirming the approximate similarity of the size and shape of an obtained 3D image and removing an unnecessary area, and after confirming an approximate matching area of the suspect tool 10 and the tool mark 20, a matching rate may be calculated.

The matching rate calculation unit 140 may calculate a matching rate between the contact portion 12 of the suspect tool 10 and the tool mark 20.

The matching rate calculation unit 140 according to an embodiment may include an image format conversion unit 142, a data conversion unit 144, and a cross-correlation coefficient calculation unit 146.

The image format conversion unit 142 may convert the 3D image of the suspect tool 10 and the tool mark 20 into a stereolithography (STL) file format image. The STL file format images is 3D data composed of connected triangular faces.

The data conversion unit 144 may convert the STL file format image into height data of the suspect tool 10 and the tool mark 20.

For example, when MATLAB is used, the data conversion unit 144 may convert an image into a matrix form and designate height data of a corresponding 3D body at each position of the matrix.

The cross-correlation coefficient calculation unit 146 may calculate a two-dimensional (2D) cross-correlation coefficient of height data of the contact portion 12 of the suspect tool 10 and the tool mark 20.

A cross-correlation coefficient is an indicator that may confirm the similarity between two or more different pieces of data. A large cross-correlation coefficient means that the degree of correlation between data is high and the similarity is high.

After calculating the 2D cross-correlation coefficient of the height data of the contact portion 12 of the suspect tool 10 and the tool mark 20, it can be confirmed that an area showing the largest 2D cross-correlation coefficient is an area having a highest matching rate.

The ROI confirmation unit 150 may extract an ROI having a highest matching rate and confirm relevant numerical information within the ROI.

For example, as a method of extracting an ROI, which is an area having a highest matching rate, template matching may be performed using the 2D cross-correlation coefficient of the height data. The method of performing template matching encompasses all methods that can be easily employed by one of ordinary skill in the art, and is not limited to a specific method.

The relevant numerical information may include a difference value and an average of the height data of the contact portion 12 of the suspect tool 10 and the tool mark 20. For example, when MATLAB is used, height data of a corresponding 3D body is aligned at each position of a matrix in which an image of the contact portion 12 of the suspect tool 10 and the tool mark 20 is converted, and a difference value and average of the height data of each position of the matrix may be obtained. In this way, by calculating the difference value and the average of the height data of the contact portion 12 of the suspect tool 10 and the tool mark 20, a difference value in the shape of the suspect tool 10 and the tool mark 20 may be compared and determined.

In addition, the ROI confirmation unit 150 may include a visualization unit 152. The visualization unit 152 may visualize relevant numerical information. For example, the visualization unit 152 may visualize the distribution of numerical values as a color map based on relevant numerical information within an ROI. An experimenter may intuitively understand the distribution of relevant numerical values within an ROI.

In addition, for example, the visualization unit 152 according to an embodiment may visualize the difference value and the average of the height data of the contact portion 12 of the suspect tool 10 and the tool mark 20. By visualizing relevant numerical information about an ROI of the suspect tool 10 and the tool mark 20 in this way, an experimenter may intuitively confirm and determine whether the suspect tool 10 and the tool mark 20 match each other in form. For example, as in FIG. 5, because there is a difference in color expression depending on the degree to which a shape of the contact portion 12 of the suspicious tool 10 and a shape of the tool mark 20 match, the experimenter may intuitively determine the degree of identity of the suspect tool 10 and the tool mark 20.

Figure 6:
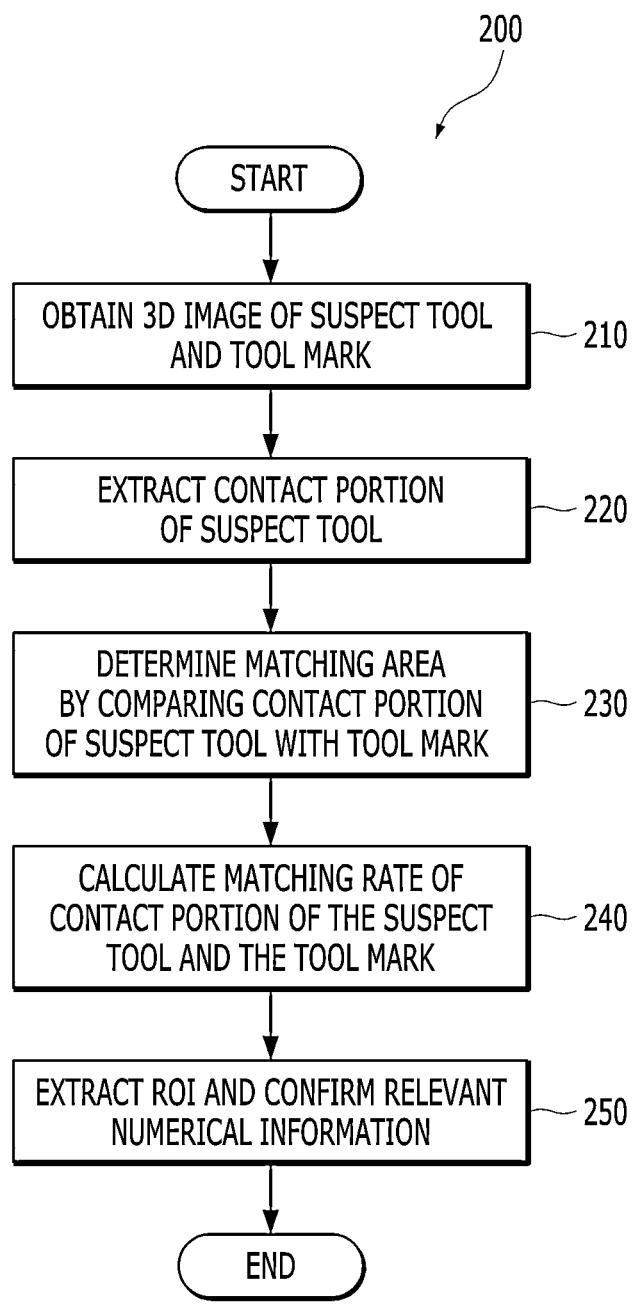
FIGS. 6 and 7 are flowcharts illustrating a method of comparing and determining 3D identity of a tool mark, according to an embodiment.
Figure 7:
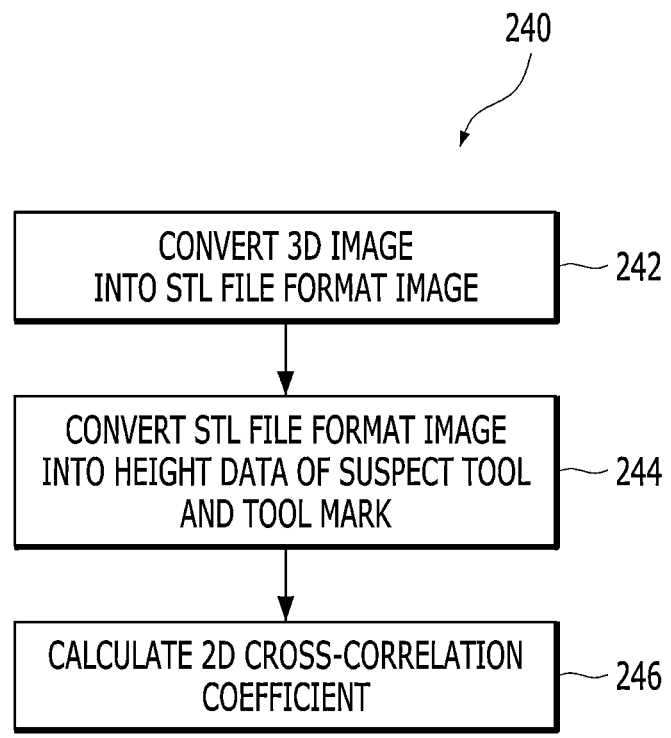

FIGS. 6 and 7 are flowcharts illustrating a method of comparing and determining 3D identity of a tool mark, according to an embodiment. Hereinafter, the method of comparing and determining 3D identity of a tool mark 200 according to an embodiment will be described with reference to FIGS. 6 and 7.

Operation 210 is obtaining a 3D image of the suspect tool 10 and the tool mark 20 by the apparatus for comparing and determining 3D identity of a tool mark 100. When comparing the suspect tool 10 with the tool mark 20 to determine the identity, in order to accurately obtain a relevant numerical value, it is preferable to obtain each 3D image by photographing at a high resolution.

Operation 220 is extracting the contact portion 12 of the suspect tool 10 contributed to the formation of the tool mark 20 from the 3D image of the suspect tool 10. For example, in the case of a driver, a blade portion may contribute to the formation of the tool mark 20, and a blade portion that is the contact portion 12 contributing to the formation of the tool mark 20 may be extracted.

Operation 230 is determining a matching area by comparing a shape of the contact portion 12 of the suspect tool 10 with a shape of the tool mark 20. For example, by directly coupling the contact portion 12 of the suspect tool 10 and the tool mark 20 in a 3D virtual space, it is possible to determine an approximate matching area. Errors may be reduced by performing numerical calculations within the approximate matching area.

Operation 240 is calculating a matching rate of the contact portion 12 of the suspect tool 10 and the tool mark 20. Operation 240 may include the following operations 242, 244, and 246.

Operation 242 is converting a 3D image of the suspect tool 10 and the tool mark into an STL file format image. Operation 244 is converting the STL file format image into height data of the suspect tool 10 and the tool mark 20. Operation 246 is calculating a 2D cross-correlation coefficient of height data of the contact portion 12 of the suspect tool 10 and the tool mark 20.

Operation 250 is extracting an ROI having a highest matching rate and confirming relevant numerical information within the ROI.

For example, the ROI may mean an area having the largest 2D cross-correlation coefficient of the height data of the contact portion 12 of the suspect tool 10 and the tool mark 20.

The relevant numerical information may include a difference value and an average of the height data of the contact portion 12 of the suspect tool 10 and the tool mark 20. As such, by obtaining the difference value and the average of the height data, it is possible to compare and determine a difference in the shape of the suspect tool 10 and the tool mark 20.

For example, in operation 250 of confirming relevant numerical information, relevant numerical information may be visualized and confirmed. As an embodiment, based on the relevant numerical information within the ROI, the distribution of a numerical difference is visualized as a color map, so that an experimenter may intuitively confirm the relevant numerical information.

The method of comparing and determining 3D identity of a tool mark 200 according to an embodiment shown in FIGS. 6 and 7 may be written as computer programs and may be implemented in general-use digital computers that execute the programs using a non-transitory computer-readable recording medium. The non-transitory computer-readable recording medium may be a magnetic storage medium (e.g., ROM, a floppy disk, a hard disk, etc.), or an optical reading medium (e.g., a CD-ROM, a digital versatile disk (DVD) or the like).

As described above, according to embodiments, when a tool mark is collected at a crime scene and a suspect tool is presented, more reliable analysis and research may be performed by objectively analyzing the identity of the suspect tool and the tool mark.

In particular, according to embodiments, an analysis result may be intuitively expressed by quantifying and visualizing the identity of a suspect tool and a tool mark.

The description herein is for describing the disclosure and numerous modifications and adaptations will be readily apparent to one of ordinary skill in the art without departing from the spirit and scope of the disclosure. For example, the relevant results may be achieved even when the described technologies are performed in a different order than the described methods, and/or even when the described elements such as systems, structures, devices, and circuits are coupled or combined in a different form than the described methods or are replaced or substituted by other elements or equivalents.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

What is claimed is:

1. A method of comparing and determining three-dimensional (3D) identity of a tool mark, the method comprising:
    obtaining a 3D image of a suspect tool and a tool mark;
    extracting a contact portion of the suspect tool contributed to formation of the tool mark from the 3D image of the suspect tool;
    determining a matching area by comparing a shape of the contact portion of the suspect tool with a shape of the tool mark; and
    calculating a matching rate between the contact portion of the suspect tool and the tool mark,
    wherein the calculating of the matching rate comprises:
        converting the 3D image of the suspect tool and the tool mark into a stereolithography (STL) file format image;
        converting the STL file format image into height data of the suspect tool and the tool mark; and
        calculating a two-dimensional cross-correlation coefficient of height data of the contact portion of the suspect tool and the tool mark.

2. The method of claim 1, comprising:
    extracting a region of interest (ROI) having a highest matching rate and confirming relevant numerical information within the ROI.

3. The method of claim 2, wherein the relevant numerical information comprises a difference value and an average of height data of the contact portion of the suspect tool and the tool mark.

4. An apparatus for comparing and determining three-dimensional (3D) identity of a tool mark, the apparatus comprising:
    at least one memory storing computer program instructions; and
    at least one processor configured to execute the computer program instructions to:
    obtain a 3D image of a suspect tool and a tool mark;
    extract a contact portion of the suspect tool contributed to formation of the tool mark from the 3D image of the suspect tool;
    compare a shape of the contact portion of the suspect tool with a shape of the tool mark to determine a matching area; and
    calculate a matching rate between the contact portion of the suspect tool and the tool mark,
    wherein calculating the matching rate comprises:

converting the 3D image of the suspect tool and the tool mark into a stereolithography (STL) file format image;

converting the STL file format image into height data of the suspect tool and the tool mark; and calculating a two-dimensional cross-correlation coefficient of height data of the contact portion of the suspect tool and the tool mark.

5. The apparatus of claim 4, wherein the at least one processor is further configured to execute the computer program instructions to:

confirm, by extracting an ROI having a highest matching rate, relevant numerical information within the ROI.

6. The apparatus of claim 5, wherein the relevant numerical information comprises a difference value and an average of height data of the contact portion of the suspect tool and the tool mark.

7. The apparatus of claim 5, wherein confirming relevant numerical information within the ROI comprises:

visualizing the relevant numerical information.

\* \* \* \* \*